Patented Mar. 26, 1935

1,995,859

UNITED STATES PATENT OFFICE 1,995,859

LATEX COMPOSITION

William E. Messer, Cheshire, Conn., assignor, by mesne assignments, to United States Rubber Company, New York, N. Y., a corporation of New Jersey No Drawing. Application October 14, 1932, Serial No. 637,789

3 Claims. (Cl. 18—53)

This invention relates to new latex compositions and their preparation and use, and to the products derived therefrom.

The preparation and direct use of latex compositions for the production of rubber layers and films etc. is recognized as a distinct field apart from the application and use of rubber derived from latex, which rubber is masticated on the mill and mixed with accelerating and other compounding ingredients prior to calendering operations. The two fields present different problems. The latter practice involves hazards of "scorching" and "setting up", which hazards are absent from the former mentioned practice. The ultra-accelerators ordinarily used and added at the mixing mill are more soluble in the rubber phase (hydrophobic) than in water (hydrophilic), and, when used with latex directly require special treatment with protective agents and a preliminary pasting operation by means of ball mills, colloid mills, or other homogenizing equipment prior to incorporation with the latex system, and besides need to be used in larger amounts than the amounts used on the mill. Furthermore longer periods of cure are required when these accelerators are so used in latex which results in lower tensile properties. It is therefore evident that the provision of such ultra accelerators as disclosed in this case that may be incorporated easily and economically in latex compositions without any preliminary pasting operation, for the production of relatively more durable products, would serve a highly useful purpose in the art of preparing rubber articles directly from the latex composition.

An object of this invention therefore is to prepare a latex composition with the aid of new accelerating compounds. A further object of the invention is to provide a latex composition having low temperature vulcanizing characteristics by means of certain accelerators that require no preliminary pasting operations prior to the introduction of the accelerator into the latex. Other objects will be apparent from the following description.

The following examples are given to illustrate the preparation and use of the new accelerators:

*Example 1. Sodium mono-methyl-cyclo-pentamethylene-dithiocarbamate.*—19 grams of carbon disulphide were added slowly under cooling to 25 grams of pipecoline which had previously been dissolved in 100 grams of water. To this solution under agitation were added 10 grams of sodium hydroxide which had previously been dissolved in 20 grams of water. The resulting solution was evaporated to dryness under carefully controlled conditions to avoid overheating. The sodium mono-methyl cyclo-pentamethylene dithiocarbamate was obtained in the form of a white powder in approximately theoretical yield to total 48 grams.

*Example 2. Potassium mono-methyl cyclo-pentamethylene dithiocarbamate.*—16.4 grams of carbon disulphide were added slowly under cooling to 21.8 grams of pipecoline which had previously been dissolved in 100 grams of water. This solution was then treated under agitation with 12.1 grams of potassium hydroxide which had previously been dissolved in 25 grams of water. The resulting solution was finally evaporated to dryness, care being taken to avoid overheating. The potassium mono-methyl cyclo-pentamethylene dithiocarbamate was recovered as a white powder in approximately theoretical yield to total 45 grams.

It is to be understood that various changes in the order of addition and amounts used in the preferred examples above may be made without departing from the essentials and spirit of the invention. To illustrate, in view of the highly volatile character of carbon disulphide, it would be desirable to use an excess of this ingredient in large scale operations, said excess being dependent on the relative efficiency of the cooling and condensing surfaces. The presence of an excess of this material does not interfere with the course of the reaction, providing the respective amounts of caustic alkali and/or pipecoline are accurately controlled, and any excess carbon disulphide would be removed during the final evaporation step. Similarly it has been possible to add the carbon disulphide directly to pipecoline, which has not been previously dissolved in water, under efficient cooling and vice versa. In turn, an organic solvent may be substituted for water to render the pipecoline soluble, e. g. acetone, alcohol, etc. The caustic alkali may also be dissolved in any mutual solvent, other than the water cited, which is not capable of entering the reaction chemically. In certain instances, where solvents other than water are to be used, it may be more convenient to dissolve the carbon disulphide instead of the pipecoline in the solvent and add the pipecoline directly to the carbon disulphide solution. This method would allow more careful control of temperature and less loss through evaporation. In addition, by selecting a solvent in which the respective dithiocarbamate to be formed is practically insoluble, the latter would crystallize or precipitate from said solvent thus avoiding the evaporation step. That such solvents could be reused would naturally occur to one skilled in the art.

Other alkali-metal salts corresponding to those cited in Examples 1 and 2 may be prepared in a similar manner by choosing the proper hydroxide as for example lithium hydroxide, etc. Instead of the alkali-hydroxides cited, corresponding water soluble alkali-carbonates, bi-carbonates, and the like may be used in equimolar quantities, providing the acidic or negative radical is derived from a weaker acid than the methyl cyclo-pentamethylene dithiocarbamic acid, and in certain instances may be facilitated through the use of heat.

*Example 3.*—In the following latex composition which is suitable for the preparation of a surgeon's glove directly therefrom by dipping operations, the accelerators mentioned above are directly incorporated, as distinguished from the use of an accelerator such as water insoluble zinc monomethyl pentamethylene dithiocarbamate which must be conditioned first with a hydrophilic protective colloid such as glue to form a smooth and uniform aqueous paste by means of homogenizing equipment prior to introducing into the latex system:

| *Latex Compound | Parts by weight |
|---|---|
| Rubber as creamed latex | 100.00 |
| Protective agent | 0.75 |
| Preservative | 0.35 |
| Colloidal sulphur | 2.50 |
| Zinc oxide | 1.00 |
| Glue | 0.10 |
| Antioxidant | 0.33 |
| Water-glass | 0.50 |
| Accelerator | 1.0 –2.0 |

*Water sufficient to give a final solids concentration of 45%.

The several methods of incorporating the respective materials cited above are well known in the art. For example, viscous or liquid materials such as certain antioxidants, etc., may be dissolved in a mutual solvent and emulsified in water in the presence of an aqueous hydrophilic colloid or peptizing agent. Antagonistic materials such as zinc oxide, etc., or other materials in powder form which are difficult to wet with water may be ball-milled with aqueous solutions of a hydrophilic protective colloid. The water soluble accelerator of the type disclosed may be added last to the latex system as an aqueous solution prior to application.

Films may be built up to the desired thickness by dipping a form repeatedly into the latex compound alone, allowing each coat to air dry slightly before the subsequent dip. As alternative to the foregoing, the dipping of the form in the latex compound may precede or follow a similar dip in a coagulating bath, such as a mixture of acetic acid and ethyl alcohol, either repeatedly or singly as desired.

The films prepared under the two general methods previously described were dried 1–1½ hrs. at 140° F. and cured 15–30 min. in hot water at 185°–190° F., and in one instance in air 30 and 45 min. at 220° F., as shown below.

| Conditions of cure | | | Accel. (pts.) | Dipping process | Potassium salt | | Sodium salt | |
|---|---|---|---|---|---|---|---|---|
| Time | Temperature °F. | Medium | | | T | E | T | E |
| 15″ | 185–190 | Water | 1 | Straight | 1050 | 605 | 2490 | 665 |
| 15″ | 180–190 | Water | 1 | Acid | 3120 | 735 | 4620 | 805 |
| 30″ | 220 | Air | 1 | Acid | 1440 | 545 | 2080 | 600 |
| 30″ | 180–190 | Water | 1 | Straight | 1890 | 690 | 1900 | 625 |
| 30″ | 180–190 | Water | 1 | Acid | 3210 | 750 | 4050 | 730 |
| 45″ | 220 | Air | 1 | Acid | 2380 | 610 | 1040 | 545 |
| 15″ | 180–190 | Water | 2 | Straight | 1860 | 635 | 1290 | 600 |
| 15″ | 180–190 | Water | 2 | Acid | 3650 | 785 | 4020 | 835 |
| 30″ | 220 | Air | 2 | Acid | 1480 | 575 | 1520 | 550 |
| 30″ | 180–190 | Water | 2 | Straight | 1570 | 605 | 1860 | 630 |
| 30″ | 180–190 | Water | 2 | Acid | 2420 | 660 | 3000 | 700 |
| 45″ | 220 | Air | 2 | Acid | 1560 | 550 | 2200 | 605 |

T=Tensile at break in pounds per sq. inch. E=Percent elongation at break.

The accelerators disclosed in the present invention may be used in other dipping processes than cited above where, for example, the form carries a coating consisting of or containing a coagulating material, or a coagulating substance has been added to the latex system to render same heat sensitive as a means of increasing rate of deposition. Furthermore, the method of curing may be modified to include open steam or low pressure steam or in turn, these accelerators being water soluble may be added directly to the water used in the water cures and omitted in the latex composition.

The latex composition of this invention may be prepared from natural or artificial aqueous dispersions of rubber, including natural latex, previously coagulated crude and/or reclaimed rubbers, or mixtures of same, and the term latex is, therefore, to be construed broadly. Further the latex may be preserved and protected by other materials than ammonia, as cited above, such as sodium hydroxide, potassium hydroxide, phenol, cresol, etc., and may be submitted to any desired concentrating operation for the purpose of the invention, for instance creaming, centrifuging, evaporating, etc. The ultra accelerators described herein are water soluble and may be used in the preparation of so-called "vulcanized latex" wherein the rubber particles are cured while dispersed in the aqueous phase.

With the detailed disclosure above given, it is obvious that various modifications will suggest themselves and it is not desired to limit the invention otherwise than as set forth in the appended claims.

Having thus described my invention, what I claim and desire to protect by Letters Patent is:

1. A latex composition containing a vulcanizing agent and a water soluble dithiocarbamate having the general formula

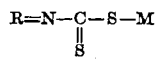

wherein R represents a monomethyl cyclopentamethylene group, and M represents an alkali-metal.

2. A vulcanized latex composition prepared with a vulcanizing agent and a water soluble dithiocarbamate having the general formula $$R=N-\underset{\underset{S}{\|}}{C}-S-M$$

wherein R represents a monomethyl cyclopentamethylene group and M represents an alkali-metal.

3. A vulcanized rubber product produced by vulcanizing a latex composition in the presence of a water soluble dithiocarbamate having the general formula $$R=N-\underset{\underset{S}{\|}}{C}-S-M$$

wherein R represents a monomethyl cyclopentamethylene group, and M represents an alkali-metal.

WILLIAM E. MESSER.